US008233476B2

(12) United States Patent
Noldus et al.

(10) Patent No.: US 8,233,476 B2
(45) Date of Patent: Jul. 31, 2012

(54) SCP-CONTROLLED OVERLAY BETWEEN GSM AND IMS

(75) Inventors: Rogier August Caspar Joseph Noldus, Goirle (NL); Stephen Terrill, Villanueva de la Cañada (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 267 days.

(21) Appl. No.: 12/520,424

(22) PCT Filed: Dec. 21, 2006

(86) PCT No.: PCT/NL2006/050323
§ 371 (c)(1),
(2), (4) Date: Jun. 19, 2009

(87) PCT Pub. No.: WO2008/075938
PCT Pub. Date: Jun. 26, 2008

(65) Prior Publication Data
US 2010/0091706 A1    Apr. 15, 2010

(51) Int. Cl.
*H04L 12/66* (2006.01)
*H04L 12/28* (2006.01)
*H04L 12/56* (2006.01)
*H04M 7/00* (2006.01)
*G06F 15/16* (2006.01)

(52) U.S. Cl. ... 370/356; 370/401; 370/426; 379/221.09; 709/228

(58) Field of Classification Search ............ None
See application file for complete search history.

(56) References Cited

U.S. PATENT DOCUMENTS

| 6,978,132 | B1 * | 12/2005 | Sladek et al. | 455/432.2 |
| 8,036,211 | B1 * | 10/2011 | Leeder et al. | 370/353 |
| 2006/0105766 | A1 * | 5/2006 | Azada et al. | 455/432.1 |
| 2006/0154665 | A1 * | 7/2006 | Svensson et al. | 455/436 |
| 2006/0276193 | A1 * | 12/2006 | Itzkovitz et al. | 455/445 |
| 2006/0291419 | A1 * | 12/2006 | McConnell et al. | 370/331 |
| 2006/0291488 | A1 * | 12/2006 | Naqvi et al. | 370/401 |

(Continued)

FOREIGN PATENT DOCUMENTS

FR    2 865 877 A1    8/2005

(Continued)

OTHER PUBLICATIONS

Wong et al, Supporting Real-Time IP Multimedia Services in UMTS, Nov. 2003, IEEE.*
Newton, Newton's Telecom Dictionary, Feb. 2006, CMP Books, pp. 801-802.*

*Primary Examiner* — Andrew Chriss

(57) ABSTRACT

The invention relates to method of executing a service in a Media Gateway Control Function (12) for establishing a call between a calling party's terminal (8) served by a Mobile Switching Center (2), and an IP Multimedia Subsystem Service (20). The Media Gateway Control Function (12) is arranged to query a Service Control Point (10) on which an overlay process is loaded. The correct SCP (10) is identified by the MGCF (12) using a correlation identifier originally published by the SCP itself after having received an IN service trigger from an MSC or GMSC. The MGCF will receive call related data from the SCP, such as the original dialled number. This data is used by the MGCF to populate information elements in a SIP Invite message. The invention gives a solution for providing GSM specific information, e.g. dialled number, location information, to an IMS service. This information may not be available to the IMS service through present methods.

12 Claims, 4 Drawing Sheets

U.S. PATENT DOCUMENTS

| | | |
|---|---|---|
| 2007/0097879 A1* | 5/2007 | Bleckert et al. ............... 370/254 |
| 2007/0100981 A1* | 5/2007 | Adamczyk et al. ........... 709/223 |
| 2007/0121608 A1* | 5/2007 | Gu et al. ....................... 370/356 |
| 2007/0173226 A1* | 7/2007 | Cai et al. ....................... 455/405 |
| 2007/0197293 A1* | 8/2007 | Jalava et al. ................... 463/40 |
| 2007/0206563 A1* | 9/2007 | Silver et al. ................... 370/351 |

FOREIGN PATENT DOCUMENTS

| | | |
|---|---|---|
| WO | WO 2006/015013 A2 | 2/2006 |

* cited by examiner

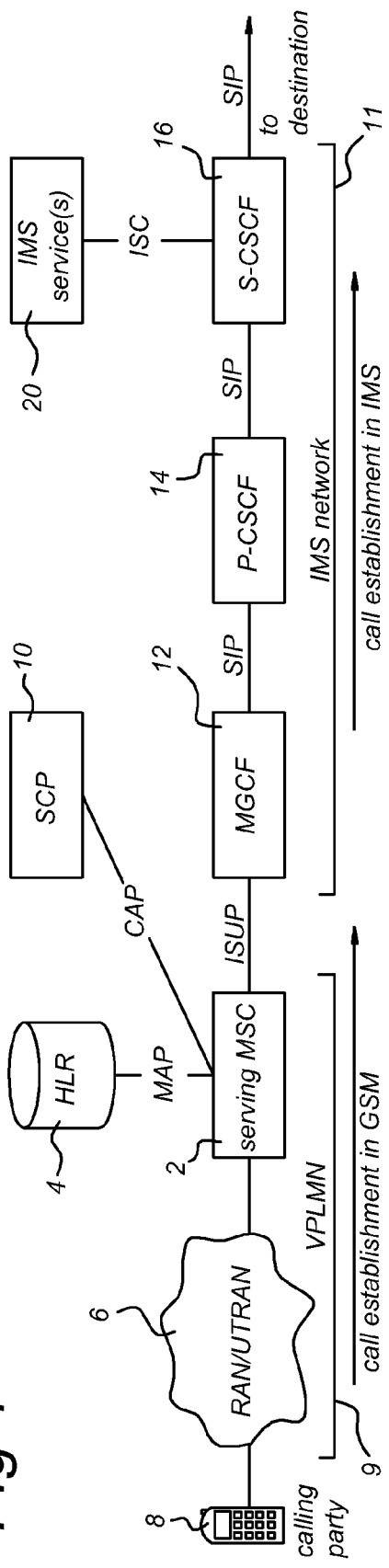
Fig 1 STATE OF THE ART.
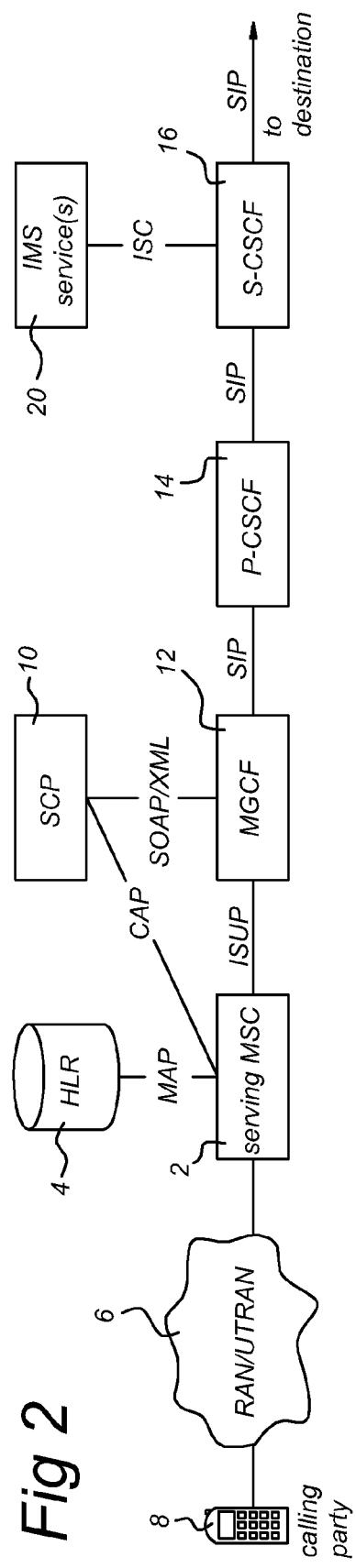
Fig 2

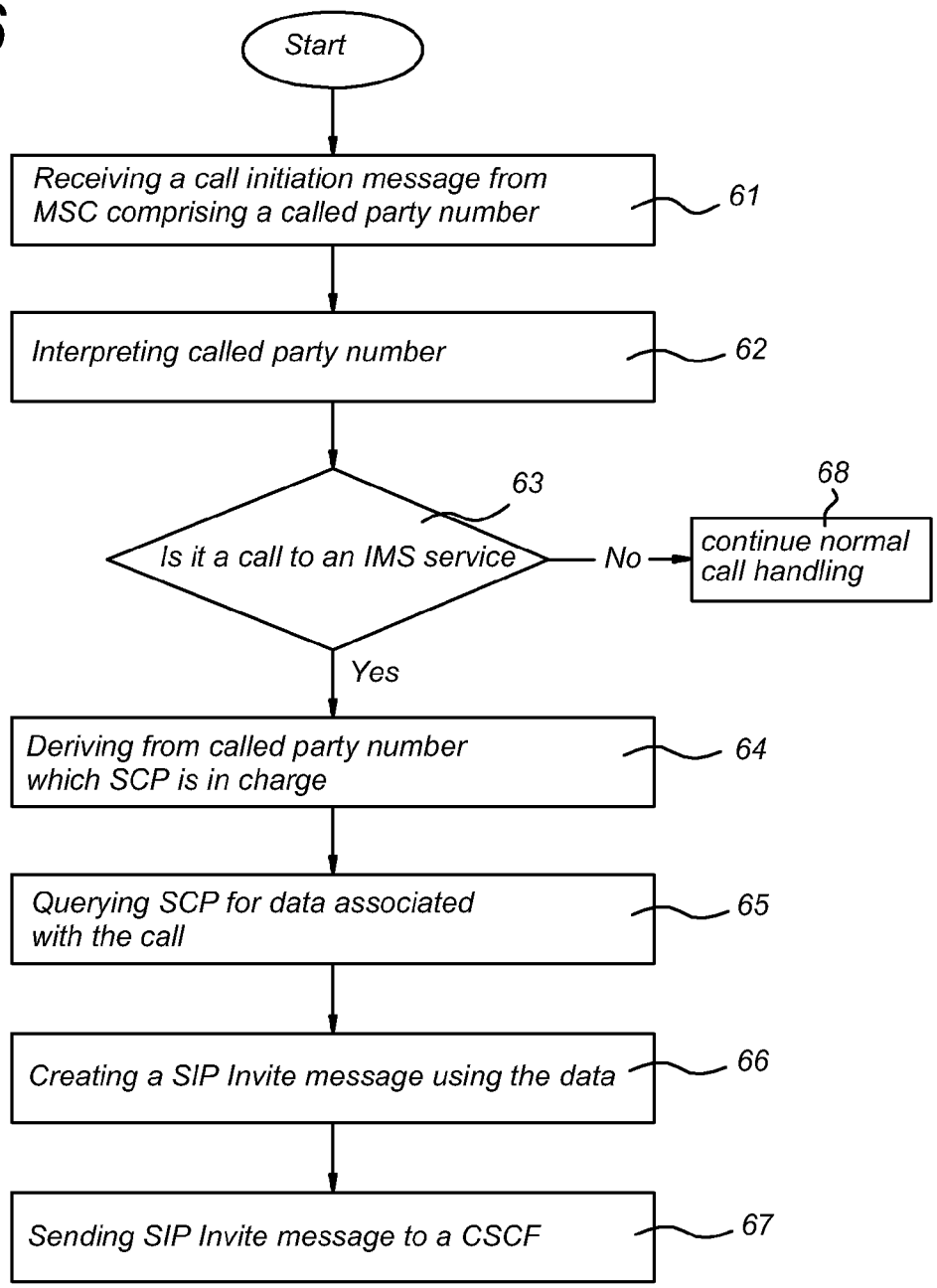

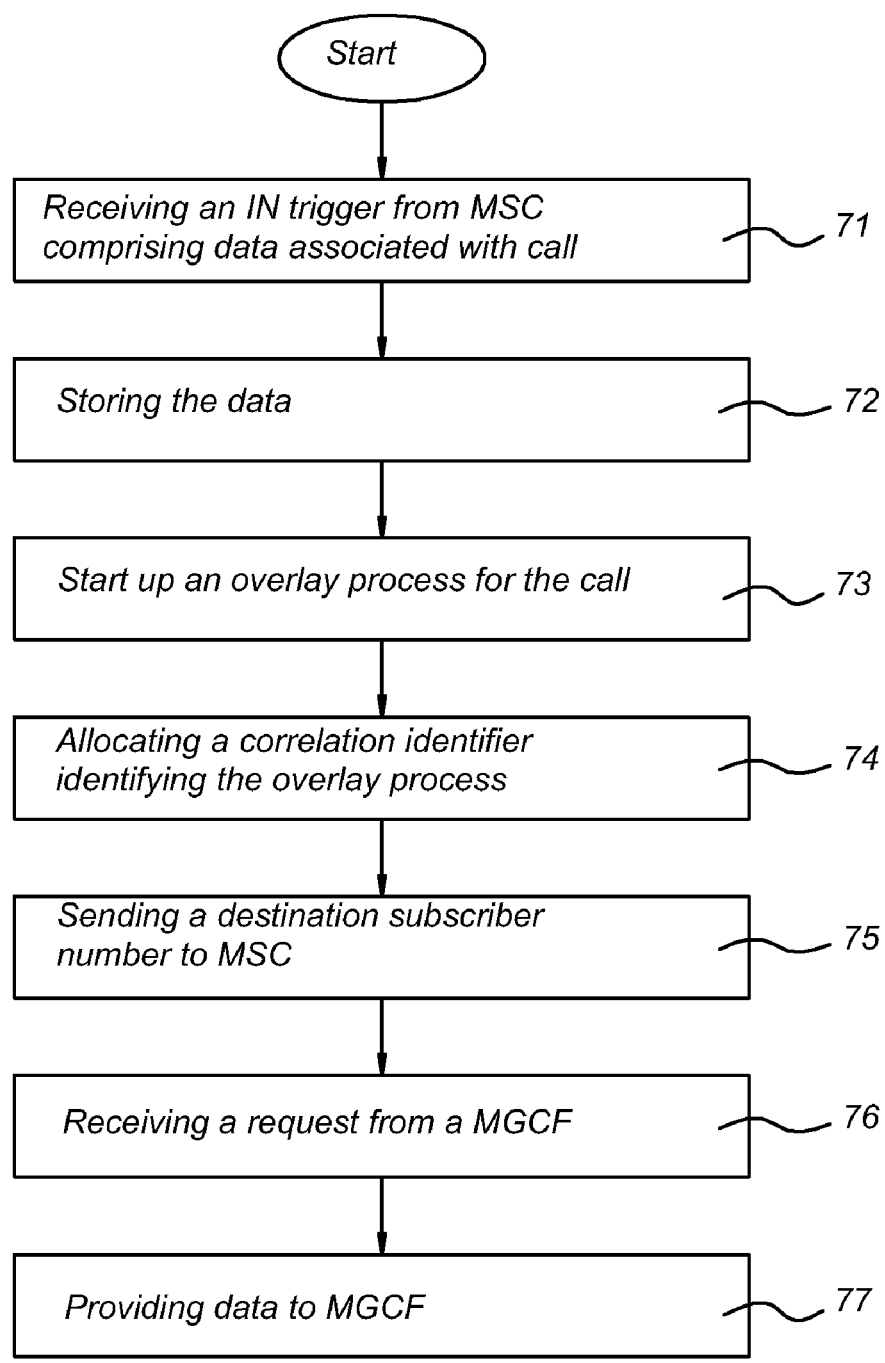

US 8,233,476 B2

SCP-CONTROLLED OVERLAY BETWEEN GSM AND IMS

TECHNICAL FIELD

The present invention relates to a method of routing a call to an IMS service.

BACKGROUND

Registration Surrogate (RS) is a technique that enables an operator to register GSM subscribers or ISDN subscribers in an Internet Protocol Multimedia Subsystem (IMS) network. The registered IMS subscribers can use GSM access, but have their services reside in the IMS network. The RS facilitates triggering of one or more IMS services when a call to/from such a GSM subscriber is routed from a GSM network to an IMS network. The routing of a call from GSM to IMS may be performed using the well known Customized Application of Mobile Network Enhanced Logic (CAMEL) "Route Home" service. The routing of a GSM call through IMS, for the purpose of executing one or more IMS services in the IMS network, is known as "GSM-IMS overlay".

One example of an IMS service for which it is desirable to be accessible in the above mentioned manner is IP-Centrex. IP-Centrex is an IMS service offering Wireless Office features. One of the aspects of IP-Centrex is the possibility to access an IMS service with GSM terminals, as well as with Session Initiation Protocol (SIP) phones. Such IMS service is commonly referred to as Multi Access IMS service. The remainder of the description takes IP-Centrex as example IMS service. The invention is, however, equally applicable to any other IMS service that may be accessed through GSM, such as Call Completion or Incoming Call Screening. Furthermore, the invention is equally applicable to calls in fixed telecommunication networks, as in mobile networks such as GSM networks or UMTS networks.

When applying CAMEL for the overlay between GSM and IMS, the called party number (CdPN), as dialled by the calling subscriber in the case of calls originating in the GSM network, can not always be maintained in the ISDN User Part (ISUP) signalling between a GSM network and an IMS network. This has mainly three reasons.

Firstly, the CdPN that is carried in the ISUP Initial Address Message (IAM) is limited to 15 address digits, by ITU-T recommendation E.164. But 15 digits may not be sufficient to address a Media Gateway Control Function (MGCF) and also includes the original dialled number, especially when the GSM call is established from abroad or from a network of a different provider. Secondly, the number frame of the CdPN in ISUP contains a Nature of Address (NoA). When an MGCF address, required for routing the call to the MGCF, is added to the CdPN, the NoA in the frame of the ISUP CdPN has to be set to national or international, depending on whether the GSM call is established in the home country or from abroad or from a different provider. As a result, the NoA of the original dialled number gets lost. A third reason is that the user may include operator-specific service selection codes (* and #) in the dialled number. These codes can not be conveyed, through ISUP, to the IMS service.

Also, when ISUP signalling traverses (inter)national network boundary, the Calling party number (CgPN) may get corrupted or lost. The CgPN is however needed to identify the calling subscriber and to trigger the IMS service. Hence, when the CgPN is not available or when it is corrupted, there is no IMS triggering possible and hence, the call can not be established through IMS overlay.

Finally, when the IMS service is triggered, vital information such as Location Information is not available to the IMS service.

SUMMARY OF THE INVENTION

A goal of the present invention is to provide a method for establishing a call between a calling party's terminal (e.g. fixed phone in a PSTN or ISDN, or a mobile phone in a PLMN) served by a Switching node and an IMS service that overcomes one or more of the problems mentioned above.

This goal is achieved by providing a method of executing a service in a Media Gateway Control Function for establishing a call between a calling party's terminal served by a Switching Node, and an IP Multimedia Subsystem service, the method comprising:
  receiving a call initiation message from the Switching Node, the call initiation message comprising a called party number;
  analysing the called party number to see whether the call set up is requested for a connection to the IP Multimedia Subsystem service;
  in the case that the call is a connection to said IP Multimedia Subsystem service, deriving from the called party number which Service Control Point is in charge;
  querying said Service Control Point for data associated with the call;
  processing the data in order to create a Session Initiation Protocol Invite message;
  sending the Session Initiation Protocol Invite message to a Call Session Control Function.

The Call Session Control Function will then further execute the call establishment process.

In an embodiment, the called party number comprises:
  a country code of an operator of said IP Multimedia Subsystem Service;
  a national destination code for said operator;
  an address of said Media Gateway Control Function;
  a correlation identifier identifying an overlay process on the Service Control Point.

The data comprises one or more of the following:
  an original dialled number dialled at said calling party's terminal;
  a calling party number associated with said call;
  location information of said calling party;
  a called party number associated with said called party;
  location information of a called party associated with said called party number;
  an International Mobile Subscriber Identification;
  an International Mobile Equipment Identity;
  a subscriber state associated with said called party.

According to an aspect of the invention, there is provided a Media Gateway Control Function for use in a telecommunication network, which Media Gateway Control Function is arranged to perform the above mentioned method.

According to another aspect, there is provided a telecommunication network comprising at least one Media Gateway Control Function as described above.

According to yet another aspect, there is provided a method of executing a service in a Service Control Point for establishing a call between a calling party's terminal served by a Switching Node and an IP Multimedia Service, the method comprising:
  receiving an IN service trigger from the Switching Node, the IN service trigger comprising data associated with the call;
  storing the data;

starting up an overlay process for the call;
allocating a correlation identifier identifying the overlay process;
sending a destination subscriber number to the Switching Node;
on receiving a request from a Media Gateway Control Function, providing the data to the Media Gateway Control Function.

The invention also relates to a Service Control Point for use in a telecommunication network, the Service Control Point being arranged to perform the method described above.

Finally, the invention relates to a telecommunication network comprising at least a Service Control Point as described above.

BRIEF DESCRIPTION OF THE DRAWINGS

The present invention will be discussed in more detail below, using a number of exemplary embodiments, with reference to the attached drawings, in which:

FIG. 1 shows a network diagram which depicts GSM-IMS overlay for a mobile originated call according to the state of the art;

FIG. 2 shows a network diagram which depicts GSM-IMS overlay for a mobile originated call according to an embodiment of the present invention;

FIG. 5 is an example of a correlation identifier;

FIG. 6 is a flow chart of actions taken by an MGCF according to an embodiment in order to establish a call to a GSM MAE subscriber;

FIG. 7 is a flow chart of actions taken by an SCP according to an embodiment.

DETAILED DESCRIPTION

Figure 3:
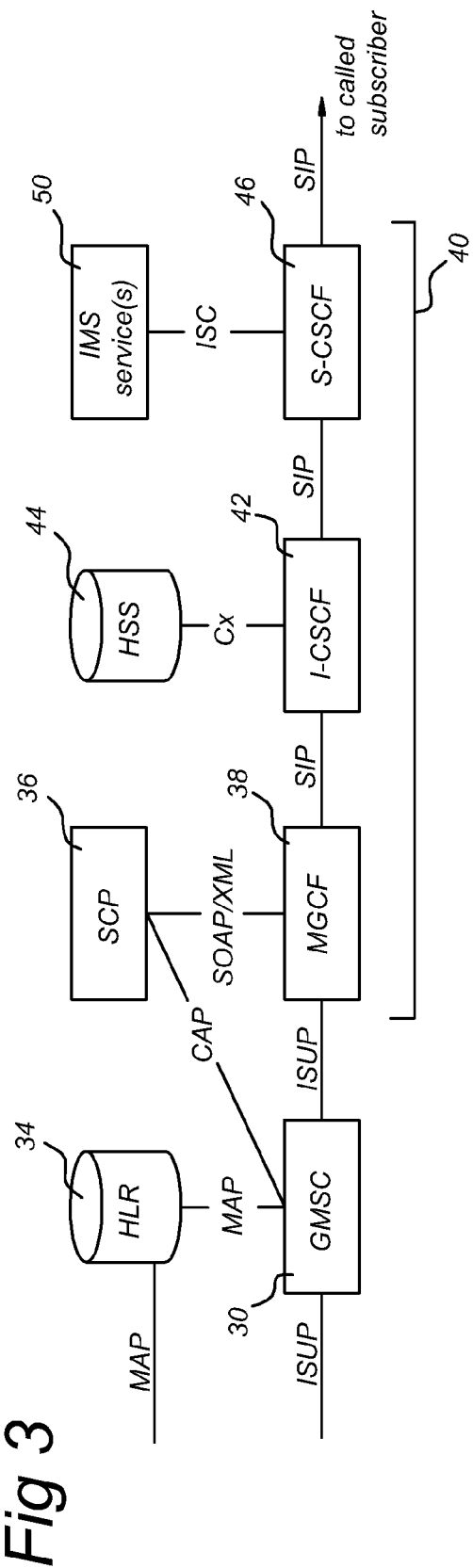
FIG. 3 depicts a network diagram which depicts GSM-IMS overlay for a mobile terminating call according an embodiment.

FIG. 1 depicts a GSM network 9 together with (part of) an IMS network 11 according to the state of the art. In FIG. 1, functional blocks are depicted, each of which may be incorporated is a separate network node, but some of them may as well be combined into a single network node. The GSM network 9 comprises a serving Mobile Switching Centre (MSC) 2 and a Home Location Register (HLR) 4 which communicates with the serving MSC 2 via e.g. a SS7 network (not shown). Furthermore a Radio Access Network (RAN) 6 is shown via which a calling party may set up a call through the GSM network 9 using a mobile station, such as a mobile phone 8. The serving MSC 2 is also communicating with a SCP 10 using CAMEL Application Part (CAP) as will be known by the skilled person. In the example of FIG. 1, the GSM network 9 is a Visited Public Land Mobile Network (VPLMN) 9. The GSM network 9 is in communication with the IMS network 11 which comprises a MGCF 12, a P-CSCF 14, a S-CSCF 16 and an IMS service 20. The P-CSCF 14 is the first contact point in the IMS network and it provides authorization of bearer resources. It also forwards a SIP register request received from a SIP User Agent (not shown) to an I-CSCF (not shown) determined using the home domain name, as provided by the IMS subscriber. In the case of Registration Surrogate (RS) the P-CSCF 14 receives the SIP register request from the RS. In the opposite direction it forwards the SIP request or response to a SIP Phone (not shown). In the case of RS, it forwards the SIP request or response to the MGCF 12. Moreover the P-CSCF 14 forwards SIP messages received from the MGCF 12 to the S-CSCF 16.

Now, a typical call flow for a Mobile originated call establishment from a GSM subscriber having access to the IMS is described according to the state of the art. This GSM subscriber is also referred to as a GSM Multi Access Extension (MAE) subscriber. The subscriber registers in the MSC 2 in the VPLMN 9, see FIG. 1. The subscriber has a profile in the HLR 4 for Centrex functionality. This profile consists of an IN service trigger named Originating CAMEL Subscription Information (O-CSI). The HLR 4 sends the O-CSI to the MSC 2. The GSM MAE Subscriber initiates a Mobile Originated call. The subscriber may dial a short code (e.g. 4500) or a public number (e.g. number in international format +31 161 24 9911; or a number in unknown format 00 31 161 24 9911; 0161 24 9911). Since the GSM MAE subscriber has O-CSI, the MSC 2 triggers an IN service in the SCP 10, i.e. the MSC 2 sends a CAMEL Application Part (CAP) Initial Detection Point (IDP) Operation to the SCP 10.

A CAP dialogue is established between the MSC 2 and the SCP 10. The SCP 10 resides in the home network of the GSM subscriber. The operator that operates this home network, known as Home Public Land Mobile Network (HPLMN), may also be the operator that operates the IMS network. The address of the SCP 10 is derived from the O-CSI. Dynamic load sharing may be applied to the IN service triggering.

The IN service may be the CAMEL Route Home service. It is noted that "CAMEL Route Home" is not official GSM terminology, but is commonly used for a CAMEL service that routes calls from a GSM subscriber to an entity in the home network. For the purpose of GSM-IMS overlay, the CAMEL Route Home service routes the call to the IMS network 11, so the service is also referred to as "CAMEL Route to IMS" service. The IN service inserts a prefix in front of the original dialled number from the subscriber. The prefix results in routing the call to the MGCF 12 of the IMS network 11. It should be noted that the CAMEL Route to IMS service may be deployed on two or more SCPs. An SS7 network (not shown) connecting the MSC 2 and the SCP 10 will route the service invocation to the SCP 10.

The SCP 10 determines that the subscriber is a GSM MAE subscriber (by virtue of a service key in the CAP IDP) and gives the MSC 2 an instruction to route the call to the MGCF 12 in the IMS network 11. The IMS network 11 contains one or more MGCFs. The number of MGCFs is determined by, amongst others, the number of subscribers in the IMS network 11 and by the geographical size of the IMS network 11. The SCP 10 will determine which MGCF to route the call to, e.g. based on the service key.

The Called Party Binary Coded Decimal (BCD) Number (CdPBN) is sent from the mobile phone 8 to the MSC 2, over the RAN 6. It contains the number as dialled by the subscriber (i.e. entered on the keypad of the GSM phone). The MSC 2 converts the CdPBN to a Called Party Number (CdPN). Further call handling in the GSM network 9, i.e. routing the call to the destination of this call (called party), is done with this CdPN. The SCP 10 will provide a different CdPN for this call, i.e. it overrides the CdPN that the MSC 2 had derived from the CdPBN, by a different number referred to as 'destination subscriber number'. The SCP 10 provides this destination subscriber number to the MSC 2 in a CAP Connect operation. For the purpose of GSM-IMS overlay, the destination subscriber number has the following format:

<cc> <ndc> <mgcf address> <original dialled number>
whereby
<cc>: country code of the IMS operator <ndc>: national destination code for the IMS operator
<mgcf address>: address of the MGCF 12
<original dialled number>: sequence of numbers dialled by the calling party The <mgcf address> consists of a number of digits to identify the MGCF 12 within the IMS network 11. The concatenation of <cc>, <ndc> and <mgcf address> constitutes the aforementioned "prefix". The SCP 10 inserts the prefix in front of the original dialled number and returns the result to the MSC 2.

The MSC 2 routes the call to the MGCF 12 of the IMS network 11. The routing of the call to the MGCF 12 is done in accordance with standard ISUP routing methods. The Called Party Number (CdPN) in the ISUP IAM contains the destination subscriber number that was provided by the SCP 10 in the CAP Connect operation. The MGCF 12 will then receive the ISUP IAM and applies ISUP to SIP conversion. The MGCF 12 generates a SIP Invite message and sends the SIP Invite to the P-CSCF 14. By using a designated IP port address, the SIP Invite at the P-CSCF 14 will be interpreted as User-to-Network Interface (UNI) signalling. Alternatively, this SIP Invite may be sent to a dedicated P-CSCF used for GSM-IMS overlay.

The GSM MAE subscriber is registered in the P-CSCF 14. The GSM MAE subscriber is also registered in the S-CSCF 16. The registration in the P-CSCF 14 and S-CSCF 16 is performed by the Registration Surrogate. The P-CSCF 14 forwards the SIP Invite to the S-CSCF 16 where this subscriber is registered. The S-CSCF 14 has so-called Initial Filter Criteria (IFC) stored for this subscriber. It will use the IFC to trigger the IP-Centrex service. The Request Universal Resource Identifier (Request URI, R-URI) in the SIP Invite contains the original dialled number. The IMS service handles the call by this subscriber, depending on the subscriber's profile in the IMS service.

When applying overlay between GSM and IMS, the original dialled number can not always be maintained in the ISDN User Part (ISUP) signalling between the GSM network 9 and the IMS network 11. This is caused by the fact that the CdPN in the ISUP IAM is limited to a predetermined number of address digits (e.g. in ITU-T recommendation E.164, the number is 15).

According to an embodiment of the present invention, this problem is solved by letting the SCP 10 and the MGCF 12 communicate with each other so that the MGCF 12 can retrieve the original dialled number from the SCP 10 during call establishment, see FIG. 2. FIG. 2 depicts a typical call flow for a Mobile Originated call establishment from the GSM network 9, including an enhancement described in the present invention.

In FIG. 2 corresponding reference numbers are used for corresponding functional blocks of FIG. 1. According to this embodiment, the SCP 10 is arranged to store the information it has received from the MSC 2 in the CAP IDP. This information may include, the CdPBN, the CgPN, an International Mobile Subscriber Identification (IMSI), an International Mobile Equipment Identity (IMEI) and Location Information.

In a particular embodiment of the present invention, the SCP 10 and the MGCF 12 are arranged to communicate the CgPN via an IP based network using the SOAP protocol to communicate XML messages (referred to as SOAP/XML query), see FIG. 2. If the CgPN gets lost in the ISUP signalling from the MSC 2 (in the VPLMN 9) to the MGCF 12 (in the IMS network 11), then the CgPN will be restored through a SOAP/XML query from the MGCF. In an embodiment, the SCP 10 is arranged to provide a destination subscriber number in a CAP Connect (CON) operation which has the following format:

<cc> <ndc> <mgcf address> <correlation identifier>
whereby
<cc>: country code of the IMS operator
<ndc>: national destination code for the IMS operator
<mgcf address>: address of the MGCF 12
<correlation identifier>: a process identifier of a GSM-IMS overlay process on the SCP 10.

Please note that the original dialled number is not part of this destination subscriber number as was the situation in the SCP according to the state of the art. The correlation identifier is allocated by the SCP 10. The SCP 10 has a pool (i.e. a list) of correlation identifiers. If there are multiple SCPs for this CAMEL Route to IMS service, then each SCP 10 has a dedicated range of correlation identifiers.

The correlation identifier may contain over-decadic digits. The use of over-decadic digits prevents that GSM users (or PSTN users) can manually dial a correlation identifier.

Once the SCP 10 has connected the call, it will release the CAP dialogue with the MSC 2. The MSC 2 routes the call to the MGCF 12 in the IMS network 11. The routing of the call to the MGCF 12 is done in accordance with standard ISUP routing method. The MSC 2 sends an ISUP IAM to the MGCF 12. The IAM contains the parameter CdPN. The MSC 2 copies the content of the destination subscriber number from CON into the parameter CdPN in the ISUP IAM. Hence, the CdPN in the ISUP IAM now contains the prefix plus the correlation identifier. The combination of the mgcf address and the correlation identifier indicates to the MGCF 12 that this call is a GSM multi access call. The MGCF 12 is arranged to store a list comprising possible combinations of the mgcf address and the correlation identifier. Said list may consist of one or more number ranges; each number range may consist of the mgcf address plus a range of correlation numbers. When an ISUP IAM is received, the MGCF 12 will look in the list and if it finds a matching combination, it will conclude that this is a call from a GSM MAE subscriber. Now, the MGCF 12 shall in response contact the SCP 10. The SCP address is derived from the correlation identifier. Since the SCP 10 and the MGCF 12 are operated by the same operator, the SCP address(es) can be configured in the MGCF 12. After having derived the SCP address, the MGCF 12 uses SOAP/XML to query the SCP 10. The MGCF 12 includes the correlation identifier in the SOAP/XML query. In an embodiment, the MGCF 12 is arranged to obtain data from the SCP 10, using SOAP to do a remote procedure call towards the SCP 10. The query towards the SCP 10 (e.g. 'provide call data'), the parameter for this remote call (e.g. 'correlation identifier') and the return parameters (e.g. 'original dialled number', 'calling party number' etc.) are represented in XML.

The SCP 10 uses the correlation identifier to retrieve the stored call information. The SCP 10 returns the data to the MGCF 12. After that, the SCP 10 purges the stored data and returns the correlation identifier to the pool. The correlation identifier may now be re-used.

The correlation identifier is used only for the duration of call routing between MSC 2 and MGCF 12 and the interrogation from the MGCF 12 to the SCP 10. Hence, a small number of correlation identifiers may suffice.

The SCP 10 will also supply the address of the P-CSCF 14 to the MGCF 12. The GSM MAE subscriber is registered in one of a number of P-CSCFs. The SCP 10 may be configured with the P-CSCF address for the subscriber, or the P-CSCF address may be derived from the service key. The SCP 10 may have received the P-CSCF address from the Registration Surrogate (RS) after the RS had registered the subscriber in the IMS network 11.

Next, the MGCF 12 applies an ISUP to SIP conversion. The MGCF 12 generates a SIP Invite and populates the SIP Invite with the information that it has received in the SOAP/XML response, such as original dialled number and CgPN. The MGCF 12 sends the SIP Invite to the P-CSCF 14. By using a designated IP port address, the SIP Invite at the P-CSCF 14 will be interpreted as User-to-Network Interface (UNI) signalling. The IMS network 11 then handles the call as was described above with reference to FIG. 1.

Thanks to the communication between the MGCF 12 and the SCP 10, there will be no loss of information in the CgPN.

The signalling link between User and P-CSCF may be regarded as UNI, for the purpose of connecting the GSM subscriber to the IMS network. Once the call has arrived at the S-CSCF 16 of the IMS network 11, the call will be handled in accordance with the user's profile.

In an embodiment, the triggering of the CAMEL route to IMS service may pass through a Service Capability Integration Manager (SCIM) situated between the MSC 2 and the SCP 10. Likewise, the ISC interface between S-CSCF 16 and the IP-Centrex may pass through a SCIM (not shown). The SCIM is arranged to call and integrate a plurality of services using a single trigger from the GSM network 9 or from the IMS network 11.

The CAMEL Route to IMS service and the IMS service have no correlation with one another. Hence, the IMS service is not dependent on access to the SCP 10 in the GSM network 9. The required information is available in the SIP Invite coming from the S-CSCF 16. In this manner, other IMS services may use the Location Information and IMSI and other GSM-specific data in the SIP Invite.

Table 1 provides an overview of the GSM access specific information that is placed in the SIP Invite sent by the MGCF 12 to the IMS network 11 according to an embodiment.

TABLE 1

| GSM element | SIP Invite header |
|---|---|
| Calling Party Number | P-Asserted-Identity |
| Called Party BCD Number | Request-URI |
| Location Information | P-Access-Network-Info; see 3GPP TS 24.229 for mapping between Location Information and P-Access-Network-Info. |
| IMSI | Pivate user identity; 3GPP TS 23.003 specifies how the Pivate user identity may be derived from IMSI. |
| Time and Time zone | Timestamp; RFC 3261 defines how Time and Time zone from the Serving MSC may be converted to the Date format and the Timestamp format for SIP. |
| MCC + MNC | P-Visited-Network-ID; the SCP may apply mapping between the MCC + MNC, as received in CAP IDP, to a text string representing the GSM operator. |
| MSC Address | P-Access-Network-Info; see RFC 3455 for a description of this SIP header. It may be included in SIP Register, SIP Invite and other SIP methods. |
| Call Reference Number | Call-Id; the Call-Id identifies a single call. Copying the GSM Call Reference Number into this field has the advantage that CDRs that are generated in the GSM network may be correlated with charging function in the IMS network. |
| IMEI | The IMEI of the calling subscriber is reported to the SCP in CAP IDP. This parameter is mapped on a SIP header. |
| MS Classmark | The MS Classmark of the calling subscriber is reported to the SCP in CAP IDP. This parameter is mapped on a SIP header. |

Now, an example of the sequence of events for a Mobile Terminated call establishment to a GSM MAE subscriber will be discussed with reference to FIG. 3. A call arrives at a Gateway MSC (GMSC) 30 for the GSM MAE subscriber. The routing of the call to the GMSC 30 follows GSM principles as will be known to the skilled person. The GSM MAE subscriber may e.g. be addressed with MSISDN.

The GMSC 30 contacts the HLR 34 to obtain routing information for this call. The subscriber is registered as GSM MAE subscriber in the HLR 34, i.e. the HLR 34 has terminating IN trigger information for the subscriber. This information consists of CAMEL subscription information (T-CSI). An optional part of terminating call handling in the HLR 34 for subscribers with CAMEL information is the obtaining of the subscriber's location information and state. Hereto, the HLR 34 contacts a Visitor Location Register (VLR) where the subscriber is currently registered.

The HLR 34 returns the IN service subscription information (T-CSI) and the subscriber's location and state information, if obtained from the VLR, to the GMSC 30. In this example, the GMSC 30 uses the T-CSI to invoke a CAMEL Route to IMS service on an SCP 36. Hereto, the GMSC 30 sends a CAP IDP to the SCP 36. The CAP IDP contains, amongst others, the Called Party Number, Calling Party Number (if available), IMSI and Location Information (if available).

The SCP 36 is arranged to store the information received in the CAP IDP and allocate a correlation identifier. For a description and use of the correlation identifier, reference is made to the above description of the Mobile originated call, see FIG. 2.

The SCP 36 routes the call to an MGCF 38 of an IMS network 40, by sending CAP Connect to the GMSC 30. The CAP Connect contains the address of the MGCF 38 and the correlation identifier. The GMSC 30 routes the call to the MGCF 38, using the information received in the CAP Connect operation. The MGCF 38 deduces from the <mgcf address> and the <correlation identifier> in the Called Party Number in the ISUP IAM that this call is a call to a GSM MAE subscriber. Therefore, the MGCF 38 uses SOAP/XML to query the SCP 36. The address of the SCP 36 is derived from the correlation identifier.

The SCP 36 uses the correlation identifier to retrieve the stored data. The SCP 36 sends the original called number to the MGCF 38. In addition, the SCP 36 provides the called party's location information to the MGCF 38. The calling party number was also stored in the SCP 36, but this number will normally remain in the ISUP signalling from the GMSC 30 to the MGCF 38, because the GMSC 30 and the MGCF 38 are located in the same network. So, the calling party number does not need to be restored. However, if the GMSC 30 is located in another network than the MGCF 38, the calling party number may get lost in the ISUP signalling between the GMSC 30 and the MGCF 38. Therefore, according to an embodiment, the SCP 36 is arranged to also provide the calling party number to the MGCF 38.

In an embodiment, a designated SIP header is defined for carrying the Location Information of the called subscriber. The P-Access-Network-Info strictly applies to the calling party. In addition, the SCP 36 may provide the following information related to the called party:

IMSI, and

Subscriber state.

For these parameters designated headers in a SIP Invite message may be defined.

The MGCF 38 will now have all information to decide that the call is destined for a GSM MAE subscriber. The MGCF 38 can therefore generate a SIP Invite message and send the SIP Invite message to a predefined I-CSCF 42. The MGCF 38 includes the called party's location information, and other information elements such as IMSI and Subscriber state, in the SIP Invite message.

The I-CSCF 42 interrogates a Home Subscriber System (HSS) 44 to obtain the called subscriber address of a S-CSCF 46. The subscriber is registered in the IMS network 40, hence the HSS 44 has the S-CSCF address for this subscriber.

When the I-CSCF has received the S-CSCF address from the HSS 44, it routes the call to the S-CSCF 46, i.e. sends the SIP Invite to the S-CSCF 46. The subscriber is registered in the S-CSCF 46, hence the S-CSCF 46 has Initial Filter Criteria (IFC) available for this subscriber. The S-CSCF 46 will now invoke a corresponding IMS service 50. In the current example, the IMS service 50 is a multi access IMS service.

The multi access IMS service handles the call to this subscriber, depending on the subscriber's profile in the multi access service. The triggering of the CAMEL Route to IMS service as well as the IMS service triggering may pass through a SCIM (not shown) as was described with reference to FIG. 2. The multi access IMS service is not dependent on access to the SCP 36 in the GSM network. The required information, notably the called party's location, is available in the SIP Invite message coming from the MGCF 38. In this manner, other IMS services, such as charging, Voice Call Continuity and Multimedia Telephony, may also use the Location Information (and other information elements such as IMSI) in the SIP Invite message. This enables the IMS service 50 to perform e.g. terminating call service functionality that needs a called party's location.

It is noted that the invention is not limited to the use of mobile networks, and that the invention also applies to fixed telephone networks, such as PSTN or ISDN. In that case the MSC 2 will be replaced by a Switching Node of a fixed telecommunication network, and the callings party's mobile station 8 by a calling party's fixed terminal.

Figure 4:
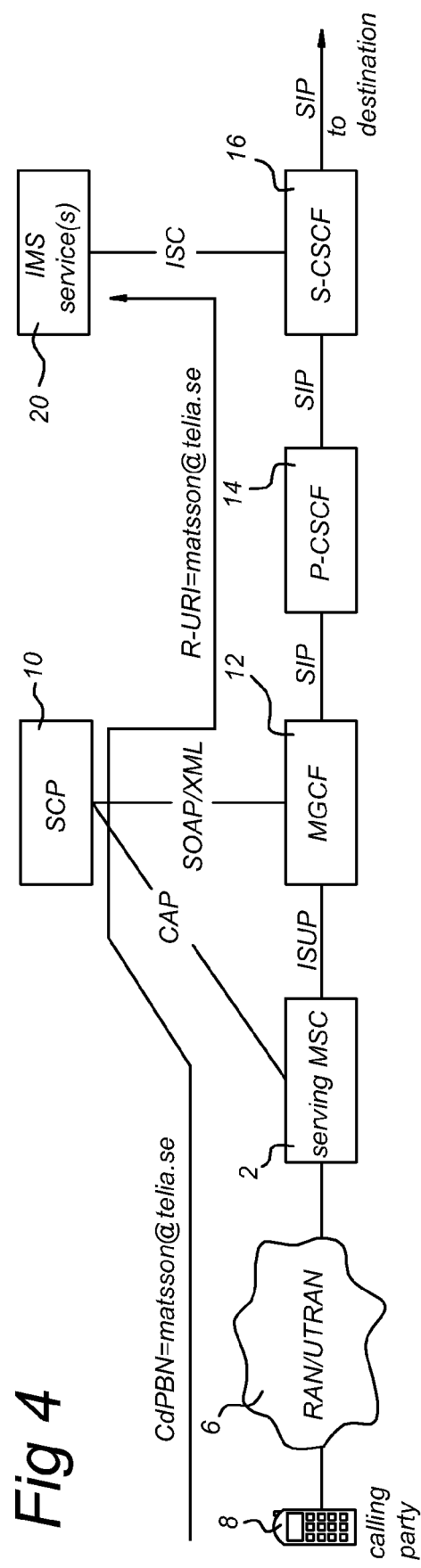
FIG. 4 depicts a network diagram of the network of FIG. 2 in which a call is established using an URI instead of a number.

FIG. 4 shows the communication network of FIG. 2, in which corresponding reference numbers refer to corresponding functional blocks. In FIG. 4, with a call establishment by a GSM subscriber according to an embodiment is depicted using a Universal Resource Identifier (URI). In FIG. 4, the URI "matsson@telia.se" is used as the CdPBN. In this embodiment, the concept of having the MGCF 12 obtain the original dialled number from the SCP 10, is used in combination with a method by means of which a GSM subscriber establishes a mobile originated call, using a URI instead of a number. E.g. set up a call to matsson@telia.se.

In an embodiment, the URI that is used by the calling GSM subscriber to establish the call is provided by the SCP 10 to the MGCF 12. In that manner, the GSM subscriber can use SIP URI calling, even when the GSM call is routed to the IMS network 11 for further processing.

In FIG. 5, an example is given of a correlation identifier identifying the GSM-IMS-overlay process on the SCP 10. The correlation identifier comprises 5 digits, four of which define the GSM-IMS overlay process on the SCP 10. The first digit is used to define the address of the SCP. In this example, the SCP 10 having an address "A" deals with the call. And process "46B7" is in charge of the routing of the call with the MGCF 12.

FIG. 6 is a flow chart of actions taken by the MGCF 12 according to an embodiment in order to establish a call from a GSM MAE subscriber. In a first step 61, the MGCF 12 receives a call initiation message from the MSC 2 comprising a called party number. This may be an ISUP IAM as described above. The CdPN in the ISUP IAM is interpreted by the MGCF 12 in a step 62. In a step 63, it is tested whether the call is a call to an IMS service. This testing is done by looking at the combination of the mgcf address and the correlation identifier as described above. If the conclusion is NO, then normal call handling is continued, see step 68. If the conclusion is YES it is a call from a GSM MAE subscriber, a step 64 follows in which the MGCD 12 derives from the CdPN which SCP is in charge. In other words, which SCP has allocated the correlation identifier and runs an overlay process for this call. Since the destination subscriber number is contained in the CdPN, the MGCF 12 is able to derive the correlation identifier. The correlation identifier is then used to query the SCP 10 using for example SOAP/XML. Alternatively, the MGCF 12 may use Lightweight Directory Access Protocol (LDAP) to query the SCP 10 or any other suitable protocol known to the skilled person. The SOAP protocol may be used in order to communicate the SOAP/XML query to the SCP 10 and to communicate a SOAP/XML response to the MGCF. The SCP 10 is queried for data associated with the call, see step 65. This data was stored by the SCP 10 when it received the IN trigger from the MSC 2. Next in a step 66, a SIP Invite message is created using the data received from the SCP 10. Finally, the SIP Invite message is sent to the CSCF 14, see step 67.

FIG. 7 is a flow chart of actions taken by the SCP 10 according to an embodiment. In a first step 71, the SCP 10 receives an IN trigger from the MSC 2. The IN trigger comprises data such as the original dialled number, which is stored by the SCP 10 in a memory of the network node on which the SCP 10 functions, see step 72. It is noted that the data may be stored on several SCPs, as will be appreciated by the skilled person. Next, in a step 73, an overlay process is started for the call. This overlay process will run on the SCP 10 until the MGCF 12 has received the call related data from the SCP 10. The SCP 10 will also allocate a correlation identifier for the call, see step 74. The correlation identifier identifies the overlay process as was discussed with reference to FIG. 5. Next, the SCP 10 sends a destination subscriber number to the MSC 2. This is done in the CAP Connect operation. If a request is received from an MGCF 12, see step 76, the overlay process running on the SCP 10 will deal with the request. The overlay process will access the memory on which the call related data was stored. This data is then provided to the requesting MGCF 12, which will use it to restore the information it received from the MSC 2.

It is noted that the SCP 10, 36 may constitute a service execution platform embodied as a single node or comprised as a functional entity within another node.

The present invention has been explained above with reference to a number of exemplary embodiments. As will be apparent to the person skilled in the art, various modifications and amendments can be made without departing from the scope of the present invention, as defined in the appended claims. Instead of using GSM, UMTS may be used as will be appreciated by the skilled person. Also it is noted that other IN services may be used and that the invention is not limited to the use of CAMEL. Furthermore, it is noted that the invention can also be used in a call establishment from a fixed telecommunication network to an IMS service.

List Of Abbreviations

| | |
|---|---|
| CAMEL | Customized Application of Mobile Network Enhanced Logic |
| CAP | CAMEL Application Part |
| CdPBN | Called Party Binary coded decimal Number |
| CdPN | Called Party Number |
| CDR | Call Detail Record |

-continued

| | |
|---|---|
| CgPN | Calling Party Number |
| CSCF | Call Session Control Function |
| CSI | Combination of CS and IMS services |
| | or |
| | CAMEL Subscription Information |
| GMSC | Gateway MSC |
| HPLMN | Home PLMN |
| HSS | Home Subscriber System |
| IAM | Initial Address Message |
| IMS | IP Multimedia Subsystem |
| IP | Internet Protocol |
| IPLMN | Interrogating PLMN |
| ISC | IMS Service Control interface |
| ISDN | Integrated Services Digital Network |
| ISUP | ISDN User Part |
| I-CSCF | Interrogating CSCF |
| MGCF | Media Gateway Control Function |
| MS | Mobile Station |
| MSC | Mobile Switching Centre |
| O-CSI | Originating CAMEL Subscription Information |
| PLMN | Public Land Mobile Network |
| PS | Packet Switched |
| PSTN | Public Switched Telephone/Telecommunications Network |
| P-CSCF | Proxy CSCF |
| RAN | Radio Access Network |
| R-URI | request URI |
| SCIM | Service Capability Integration Manager |
| SCP | Service Control Point |
| SIP | Session Initiation Protocol |
| SIP-URI | SIP Universal Resource Identifier |
| SOAP | Simple Object Access Protocol |
| S-CSCF | Serving CSCF |
| SR | Surrogate Registration |
| T-CSI | Terminating CAMEL Subscription Information |
| UNI | User-to-Network Interface |
| URI | Universal Resource Identifier |
| UTRAN | Universal Terrestrial Radio Access Network |
| VPLMN | Visited PLMN |
| XML | Extended Mark-up Language |

The invention claimed is:

1. A method of executing a service in a Media Gateway Control Function for establishing a call between a calling party's terminal served by a Switching Node, and an IP Multimedia Subsystem Service, said method comprising:
   receiving a call initiation message from said Switching Node, said call initiation message comprising a called party number;
   analyzing said called party number to determine whether the call set up is requested for a connection to said IP Multimedia Subsystem service;
      deriving a Service Control Point from said called party number if said call is a request for a connection to said IP Multimedia Subsystem Service, where the Service Control Point handles said call;
   querying said Service Control Point for data associated with said call;
   processing said data in order to create a Session Initiation Protocol Invite message; and
   sending said Session Initiation Protocol Invite message to a Call Session Control Function.

2. The method according to claim 1, wherein said called party number comprises:
   a country code of an operator of said IP Multimedia Subsystem Service;
   a national destination code for said operator;
   an address of said Media Gateway Control Function; and
   a correlation identifier identifying an overlay process on said Service Control Point.

3. The method according to claim 2, wherein said testing if said call initiation indicates that the call is a call to said IP Multimedia Service comprises:
   searching in a list for an entry resembling a combination of said address of said Media Gateway Control Function and said correlation identifier.

4. The method according to claim 1, wherein said Service Control Point is queried using Simple Object Access Protocol (SOAP).

5. The method according to claim 1, wherein said call initiation message comprises an ISDN User Part Initial Address Message.

6. The method according to claim 1, wherein said data comprises at least one of:
   an original dialed number dialed at said calling party's terminal;
   a calling party number associated with said call;
   location information of said calling party;
   a called party number associated with said called party;
   location information of a called party associated with said called party number;
   an International Mobile Subscriber Identification (IMSI);
   an International Mobile Equipment Identity (IMEI); and
   a subscriber state associated with said called party.

7. A method of executing a service in a Service Control Point for establishing a call between a calling party's terminal served by a Switching Node and an IP Multimedia Service, said method comprising:
   receiving an IN service trigger from said Switching Node, said IN service trigger comprising data associated with said call;
   storing said data;
   start up an overlay process for said call;
   allocating a correlation identifier identifying said overlay process;
   sending a destination subscriber number to said Switching Node; and
   on receiving a request from a Media Gateway Control Function, providing said data to said Media Gateway Control Function.

8. The method according to claim 7, wherein said destination subscriber number comprises:
   a country code of an operator of said IP Multimedia Subsystem Service;
   a national destination code for said operator;
   an address of said Media Gateway Control Function;
   a correlation identifier identifying said overlay process on said Service Control Point.

9. The method according to claim 7, wherein said IN service trigger is based on IN subscription information comprising O-CSI, T-CSI, line based trigger criteria or number based trigger criteria.

10. The method according to claim 7, wherein it is determined whether said call is from a GSM MAE subscriber by virtue of the value of a service key in a CAP Initial DP operation.

11. The method according to claim 7, said method further comprising:
   routing said call from said Switching Node to said Media Gateway Control Function in said IP Multimedia Service network.

12. The method according to claim 7, wherein said data comprises at least one of:
   an original dialed number dialed at said calling party's terminal;
   a calling party number associated with said call;
   location information of said calling party;
   location information of a called party associated with said called party number;
   an International Mobile Subscriber Identification (IMSI);
   an International Mobile Equipment Identity (IMEI);
   a subscriber state associated with said called party.

* * * * *